(12) United States Patent
Rooney et al.

(10) Patent No.: US 6,242,021 B1
(45) Date of Patent: Jun. 5, 2001

(54) PRETZEL STICK SNACK ITEM

(76) Inventors: Jessica Rooney; Kathleen Rooney, both of 251 Bristol St., Northfield, IL (US) 60093

( * ) Notice: Subject to any disclaimer, the term of this patent is extended or adjusted under 35 U.S.C. 154(b) by 0 days.

(21) Appl. No.: 09/551,640

(22) Filed: Apr. 18, 2000

(51) Int. Cl.⁷ .................................................. A21D 13/00
(52) U.S. Cl. ........................... 426/89; 426/104; 426/391; 426/497; 426/302; 426/309
(58) Field of Search .................... 426/89, 94, 104, 426/272, 275, 549, 497, 391, 302, 309

(56) References Cited

U.S. PATENT DOCUMENTS

| | | | |
|---|---|---|---|
| Re. 34,208 | * 3/1993 | Shaw | 446/75 |
| 1,951,357 | * 3/1934 | Hall | 426/103 |
| 2,160,730 | * 5/1939 | Hackett | 426/104 |
| 2,882,170 | * 4/1959 | Stewart | 426/110 |
| 3,892,867 | * 7/1975 | Schoonman | 426/93 |
| 4,251,201 | * 2/1981 | Krysiak | 425/132 |
| 4,539,211 | * 9/1985 | Armando et al. | 426/291 |
| 5,804,235 | * 3/1934 | Altschul | 426/104 |
| 5,863,583 | * 9/1998 | Altschul | 426/302 |

FOREIGN PATENT DOCUMENTS

0475911 A1 * 3/1992 (EP) ................... A23L/1/16

* cited by examiner

*Primary Examiner*—Milton Cano
*Assistant Examiner*—Sherry A. Dauerman
(74) *Attorney, Agent, or Firm*—Gregory B. Beggs

(57) ABSTRACT

A small, bite-sized snack food item is disclosed which combines a pretzel stick and a group of cereal rings annularly disposed on the stick, thereby combining the flavor of the pretzel with the flavor of the cereal in a bite-sized unit. The unit can be held by the fingers of one hand, and bitten off, and it also may be attractive to a child in the manner of a toy. The stick may also be coated with candy or another contrasting food substance.

13 Claims, 2 Drawing Sheets

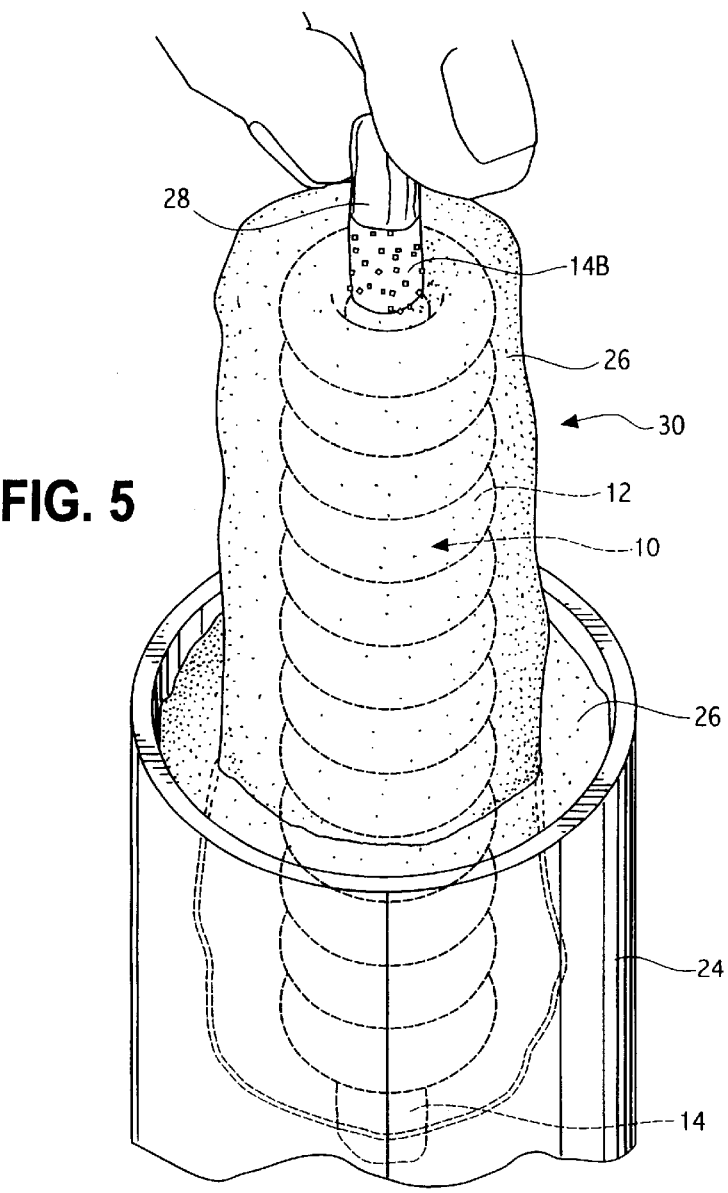
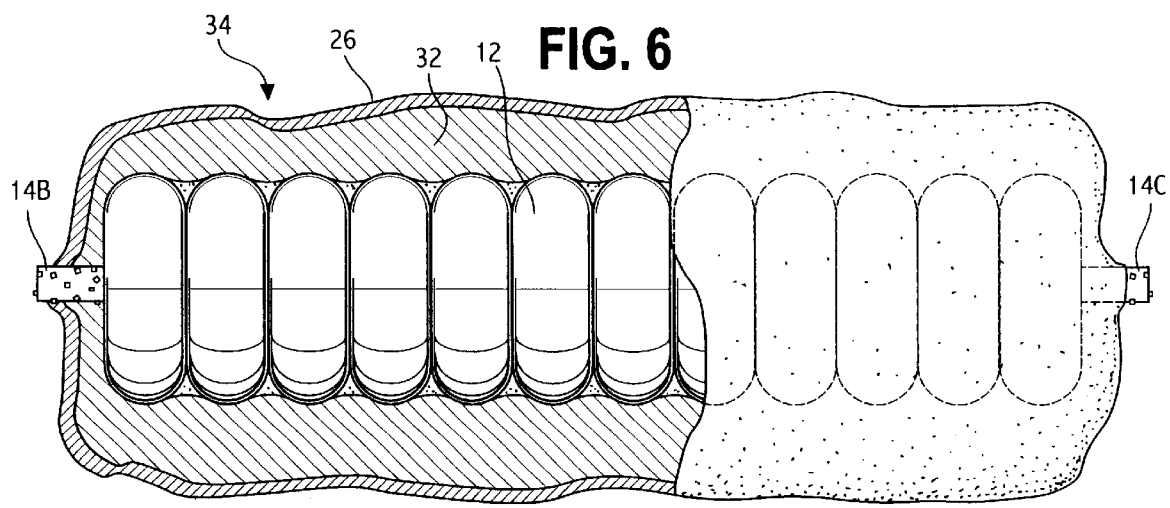

PRETZEL STICK SNACK ITEM

This invention pertains to small, bite-sized snack food items and more particularly to one-to-two-bite snack food items which are completely consumable combinations of at least two bakery-good elements arranged to be bitten through and munched together.

Various prior art consumable snack items can be found in which an edible element is strung on a core or suspension member or is adhesively stuck together with similar edible elements. One such item is disclosed in United Kingdom patent No. 6972 dated Jun. 8, 1885. In that patent a number of edible beads "a" are strung or threaded upon a thread "of elastic or other soft material." The small beads "are of confectionary." In U.S. Pat. Nos. 5,804,235 and 5,863,583, cereal annuli are arranged in a three dimensional, predetermined relationship and held together there enmasse with a digestible adhesive such as a sugar solution. Similarly, in U.S. Pat. No. 3,892,867 to Schoonman, the patentee discloses a water-soluble adhesive in the form of a liquid sugar film holding a plurality of edible discs (of compressed and powdered coffee, milk, sugar, etcetera). The discs or "wafers" are referred to as "annular discs."

Also of note is the disclosure of U.S. Pat. No. 2,160,730 to Hackett, wherein both an outer body of popcorn and an inner, candy core or support member are edible. U.S. Pat. Nos. 1,951,357 to Hall, 2,882,170 to Stewart and RE 34,208 to Shaw disclose edible annular members associated with non-edible supports extending through the central apertures thereof. U.S. Pat. No. 4,251,201 to Kruysiak discloses, in a general manner, a shaped food item in which a filling material is enclosed in a coating material. And somewhat similarly, European Patent Application No. 0 475 911 A1 in the name of Bertarini discloses a pillow of pasta containing a compatible filing material. Both the Krysiak patent and the European Patent Application relate to extruded food products.

SUMMARY OF THE INVENTION

Against the above recited background of bite-sized food products, the present invention combines a pretzel stick and a group of cereal rings annularly disposed upon the pretzel stick so that the stick may be held by one end and the other free end bitten off by a consumer. The snack item of the present invention is a one-to-two-bite sized food item comprising a straight pretzel stick about three inches long, and a plurality of cereal rings arranged on and adhered to the stick.

It is an object of the present invention to provide a snack item which combines the flavor of a pretzel with a flavored cereal in a bite-sized unit.

It is a further object of the present invention to provide a snack item which can be conveniently held at one end by a consumer and the other, free end either bitten off or licked by the consumer.

It is a further object of the present invention to provide a snack item which appeals to children as a toy wherein the toy is formed of a small stick member and ring members mounted in a clump on the stick.

These and other objects of the invention will become more apparent and will be better understood with reference to the subsequent detailed description considered in conjunction with the accompanying drawings.

BRIEF DESCRIPTION OF THE DRAWINGS

FIG. 5 is a perspective view of a modified form of the embodiment of the present invention shown in FIG. 1 illustrating the original embodiment of FIG. 1 dipped in a bath of a coating substance such as melted chocolate; and FIG. 6 is a perspective view, partially broken away, of a further modification of the embodiment of the present invention shown in FIG. 1 illustrating the original embodiment of FIG. 1 embedded in a food product, such as peanut butter, surrounded with an outer coating of a second food product, such as chocolate.

DETAILED DESCRIPTION OF THE PREFERRED EMBODIMENT

Figure 1:
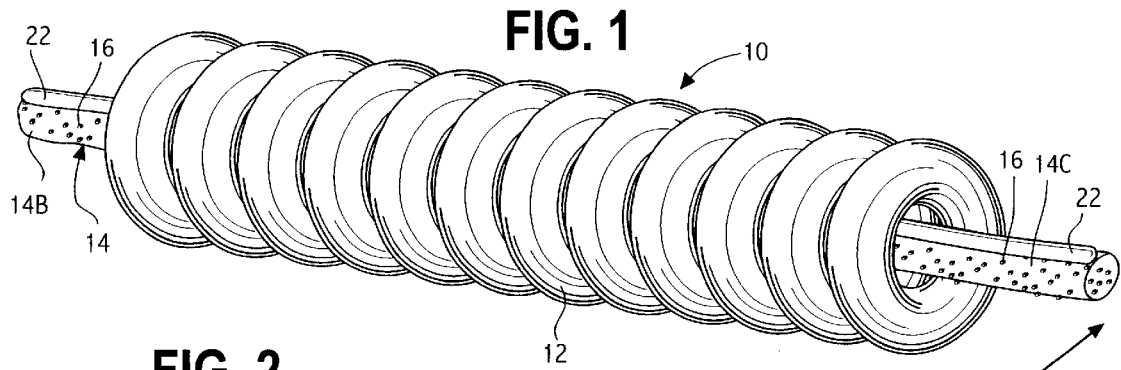
FIG. 1 is a perspective view of an embodiment of the present invention which includes a plurality of cereal rings assembled on a straight pretzel stick.

Referring to FIG. 1, a preferred form of the snack item embodying the present invention is shown at 10. The cereal rings 12 are arranged on a pretzel stick 14 which, preferably, is a substantially straight stick about three inches long. As used in this description, the term "pretzel" may be understood in its normal sense of a baked biscuit, but other similar forms of an edible, baked stick member may be used as a rod for the cereal rings to be mounted upon. The cereal rings are arranged on the stick 14 in close proximity to one another and adhered to the stick so that they will not slide or fall off.

It has been found that the cereal rings may be especially appetizing when they have a flavoring component, whether incorporated in the cereal or coating the rings, which contrasts with a flavoring component of the pretzel stick. One such contrast is a honey nut flavor in the cereal rings which contrasts with salt granules, as shown at 16, on the pretzel stick. Another desirable flavoring component for the cereal rings is peanut butter.

Figure 2:
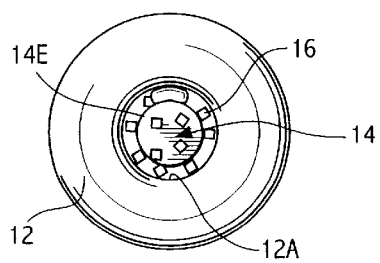
FIG. 2 is an end view of the embodiment of the present invention shown in FIG. 1 taken in the direction of arrow A in FIG. 1.
Figure 3:
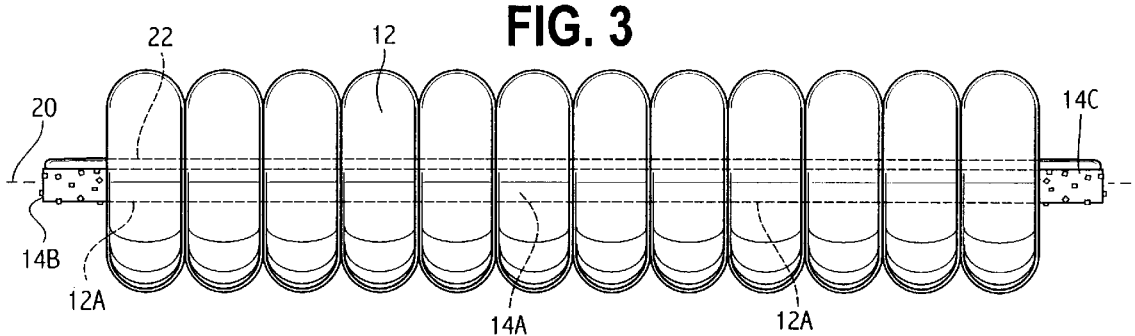
FIG. 3 is an elevational view of the embodiment of the present invention shown in FIG. 1 taken in the direction of arrow B in FIG. 1.

As shown, especially in FIG. 2, the cereal rings, 12 normally include a centrally apertured portion 12A substantially encircling the pretzel stick 14. The cereal ring may, however, be partially broken away, as shown at 18 in FIG. 4, and thus not entirely encircle the pretzel stick. The pretzel stick includes a longitudinal axis 20 which extends through the centrally apertured portions 12A of cereal rings 12, as shown in FIG. 3, for example, wherein the cereal rings 12 are shown adjoining one another along a central portion 14A of the pretzel stick intermediate the end portions 14B and 14C of the pretzel stick.

One means of adhering the cereal rings to the pretzel stick is to coat the rings with an adhesive substance such as a syrup. Normally the outer surface of the pretzel, such as 14E, is glazed, and thus the adhesion between the syrup on the cereal rings and the glazed outer surface 14E of the pretzel may be quickly and firmly accomplished.

Another means of accomplishing an adhesion between the outer surface of the pretzel and the cereal rings is to provide a strip of an intermediate food element 22 along the pretzel's outer surface. A soft, sticky candy is one such material, and those skilled in the culinary arts will easily think of alternatives. Still another alternative (not shown) is to pour a food element coating over the cereal rings, as may be provided by melted chocolate, and permit the coating to rigidify and encase portions of the cereal rings and the pretzel stick.

Figure 4:
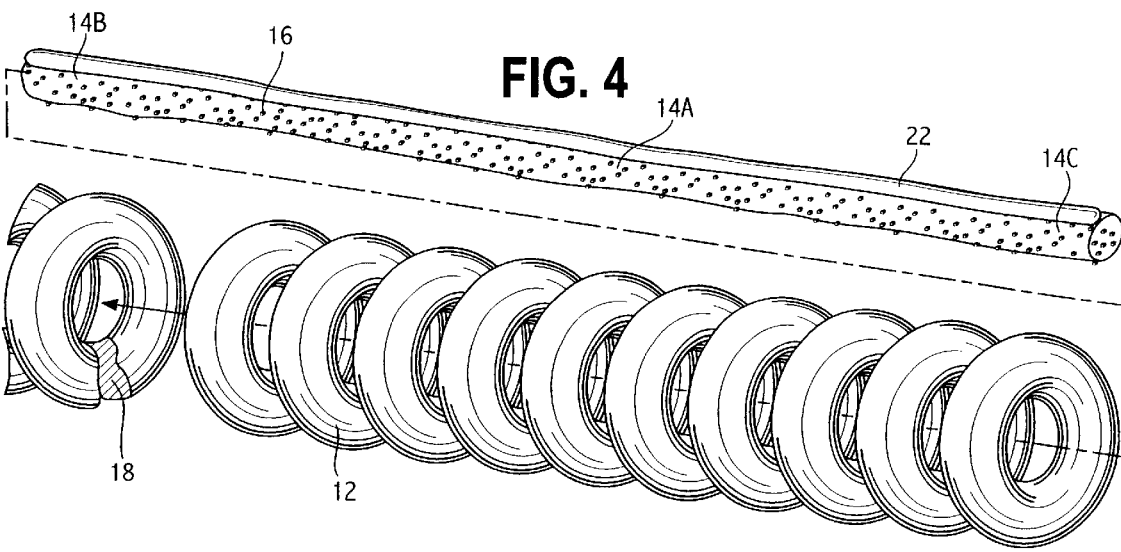
FIG. 4 is an exploded view of a portion of the embodiment of the present invention shown in FIG. 1.

At times, the broken away portion 18 of a cereal ring may by substantially greater than as shown in FIG. 4, leaving only a segment of a cereal ring, formed in an irregular shape, adhered to the pretzel stick. Also, broken bits of cereal rings may be adhered to the pretzel stick intentionally, thus leaving irregular shapes of cereal rings adhered to the outside of the stick, but still accomplishing a prime goal of the invention to combine the cereal rings with a small, straight pretzel in a bite-sized snack item.

The cereal rings 12 may be arranged along the pretzel stick 14 with small spaces between them as shown in the exploded view of FIG. 4, or more closely together and clumped as shown in FIG. 3. Preferably, at least one end portion of the pretzel stick, such as 14B or 14C extends outwardly from the adjoining cereal rings, to provide a small handle for holding the pretzel stick-cereal ring combination.

Those persons who are skilled in culinary arts may use a variety of ways for assembling the cereal rings on the pretzel stick in order to make the completed snack item shown in FIGS. 1 and 3. Also, mass production may lead to ways for making the assembled snack items which differ from those an individual cook might use. However, one way to make the assembly is to dip the pretzel stick into a liquified body of an edible bonding agent such as a syrup, holding the end portion of the pretzel stick above the syrup. Then after removing stick from the syrup and allowing it to drip off any syrup excess, to manipulate the pretzel stick like a needle in a bowl of loose cereal rings. The cook can engage the rings on the free end of the pretzel stick and assemble as many rings together as desired. A snack item completed in this manner can then be set aside on a drying sheet until the syrup has hardened and the cereal rings are stuck to the pretzel stick.

Another, similar, way of making the assembly, is to use an applicator for applying a strip of a sticky candy element as at 22 along most of the length of the pretzel stick and thereafter manipulate the stick like a needle in a bowl of loose cereal rings as described above.

A modified form 30 of the embodiment of the present invention shown in FIG. 1 is shown in FIG. 5. As shown in the latter figure, the combination 10 of the pretzel stick 14 with cereal rings 12 assembled thereon may be dipped into a container 24 of melted chocolate or similar candy jacketing composition one or more times by holding end 14B in a holder, such as waxed paper 28, and lifting the combination 10 up and down until it is thoroughly coated. Alternatively, the melted chocolate may be painted or sprayed onto the cereal rings, rather than dipped, or another flavored or textured coating such as a fruit glaze, sugar, candy or nut composition may be applied to the outside of the cereal rings instead. The resulting coated assembly 30 may then be set aside to solidify before being eaten.

A still further modified form 34 of the present invention shown in FIG. 1 is shown in FIG. 6. In that figure, it may be seen that the cereal rings 12 are embedded in an inner food product coating 32, such as peanut butter, with which the rings 12 have been covered and an outer coating of melted chocolate 26 or similar food coating or glaze applied. The resulting coated assembly 34 similarly may be set aside for the outer jacket of chocolate or glaze to solidify before being eaten.

It is to be understood that the above detailed description of preferred embodiments of the invention is provided by way of example only. Various details of design, construction and procedure may be modified without departing from the true spirit and scope of the invention, as set forth in the appended claims below.

What is claimed is:

1. A one-to-two bite sized food item comprising:
a straight pretzel stick about three inches long, and a plurality of cereal rings arranged on and adhered to the stick.

2. The food item of claim 1, in which the cereal rings include a flavor component which contrasts to a flavor component of the pretzel stick.

3. The food item of claim 1, in which the pretzel stick is encrusted with salt granules which contrast with a flavor component of the cereal rings.

4. The food item of claim 2, in which the cereal rings include centrally apertured portions substantially encircling the pretzel stick.

5. The food item of claim 4, in which the pretzel stick includes a longitudinal axis extending through the centrally apertured portions of the cereal rings.

6. The food item of claim 5, in which the cereal rings adjoin one and another along a central section of the pretzel stick intermediate the ends of the stick.

7. The food item of claim 6, in which the pretzel stick includes at least one end portion extending outwardly from the adjoining cereal rings.

8. The food item of claim 1, in which the pretzel stick includes an outer surface portion adhered to the cereal rings with an intermediate food element.

9. The food item of claim 1, in which the cereal rings are adhered to the pretzel stick with a food element coating over the cereal rings.

10. The food item of claim 1, in which the cereal rings are formed in irregular shapes.

11. The food item of claim 1, in which the cereal rings are coated with a candy jacketing composition.

12. The food item of claim 1, in which the cereal rings are embedded in an inner food product coating and the cereal rings and the inner food product coating are covered by an outer food product coating.

13. The method of making a one-to-two bite sized food item which includes the steps of:
assembling a plurality of cereal rings on a straight pretzel stick about three inches long;
the cereal rings having a flavor component which contrasts to a flavor component of the pretzel stick;
assembling the cereal rings upon and adhering them to the pretzel stick; and
coating the assembly of cereal rings on the pretzel stick with a food product.

* * * * *